United States Patent
Mandaleeka

(10) Patent No.: US 11,068,393 B2
(45) Date of Patent: Jul. 20, 2021

(54) ENHANCED CONCURRENCY GARBAGE COLLECTION STACK SCANNING

(71) Applicant: Microsoft Technology Licensing, LLC, Redmond, WA (US)

(72) Inventor: Aditya Mandaleeka, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 16/656,522

(22) Filed: Oct. 17, 2019

(65) Prior Publication Data
US 2021/0117319 A1    Apr. 22, 2021

(51) Int. Cl.
G06F 12/02    (2006.01)
G06F 9/50    (2006.01)

(52) U.S. Cl.
CPC ........ G06F 12/0269 (2013.01); G06F 9/5016 (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 8,601,036 B2 | 12/2013 | Nalla et al. | |
| 8,825,719 B2 | 9/2014 | Steensgaard et al. | |
| 2003/0069905 A1 | 4/2003 | Dussud | |
| 2004/0128329 A1 | 2/2004 | Ben-Yitzhak et al. | |
| 2005/0033781 A1 | 2/2005 | Dussud | |
| 2005/0235120 A1 | 10/2005 | Dussud | |
| 2006/0020766 A1 | 1/2006 | Dussud | |
| 2006/0085460 A1 | 4/2006 | Peschel-Gallee et al. | |
| 2006/0085494 A1 | 4/2006 | Dussud et al. | |
| 2006/0156152 A1 | 7/2006 | Trowbridge et al. | |
| 2006/0230087 A1 | 10/2006 | Andreasson | |
| 2006/0230387 A1 | 10/2006 | Prakriya et al. | |

(Continued)

OTHER PUBLICATIONS

"International Search Report and Written Opinion Issued in PCT Application No. PCT/US20/054650", dated Feb. 1, 2021, 12 Pages.

(Continued)

*Primary Examiner* — Jane Wei
(74) *Attorney, Agent, or Firm* — Ogilvie Law Firm

(57) ABSTRACT

Garbage collection (GC) to reclaim memory in computing systems sometimes suspends applications, web services, and other mutator programs in order to scan their execution stacks, which reduces their responsiveness. But suspension times are decreased by behavior-driven stack scan optimization (BDSSO) functionality that increases the concurrency of mutator execution with GC stack scanning. BDSSO obtains execution stack frame occurrence data, determines frame execution likelihoods, selects a stack scan depth based on the likelihoods, and installs a scan return barrier at the selected depth. Then the GC scans the execution stack below the barrier while the mutator runs, thus increasing concurrency and improving mutator responsiveness. Selected barrier locations vary according to actual stack activity to provide optimized concurrency instead of using an inflexible approach to barrier placement. Existing profiler samples or virtual machine interfaces can be reused by BDSSO. Skinny samples that lack profiler performance data may also be used.

20 Claims, 4 Drawing Sheets

(56) References Cited

U.S. PATENT DOCUMENTS

| | | | |
|---|---|---|---|
| 2006/0294166 | A1 | 12/2006 | Borman et al. |
| 2007/0011658 | A1 | 1/2007 | Stephens |
| 2007/0022268 | A1 | 1/2007 | Stephens |
| 2007/0094651 | A1 | 4/2007 | Stephens et al. |
| 2007/0094671 | A1 | 4/2007 | Stephens et al. |
| 2008/0172431 | A1 | 7/2008 | Stephens et al. |
| 2008/0281885 | A1 | 11/2008 | Dussud |
| 2009/0222802 | A1 | 9/2009 | Dussud et al. |
| 2009/0254596 | A1 | 10/2009 | Dussud et al. |
| 2009/0259702 | A1 | 10/2009 | Stephens et al. |
| 2009/0265402 | A1 | 10/2009 | Dussud et al. |
| 2009/0300085 | A1 | 12/2009 | Stephens et al. |
| 2010/0318584 | A1 | 12/2010 | Krishnaprasad et al. |
| 2013/0091186 | A1 | 4/2013 | Stephens et al. |
| 2015/0169444 | A1* | 6/2015 | Kawachiya ......... G06F 12/0276 707/819 |
| 2015/0227414 | A1 | 8/2015 | Varma |
| 2016/0239413 | A1 | 8/2016 | Stephens et al. |
| 2016/0306739 | A1 | 10/2016 | Stephens et al. |
| 2017/0322877 | A1 | 11/2017 | Chan |
| 2017/0351490 | A1 | 12/2017 | Wrighton et al. |
| 2018/0217779 | A1 | 8/2018 | Stephens et al. |
| 2018/0217927 | A1 | 8/2018 | Stephens et al. |

OTHER PUBLICATIONS

"Cloud Gal Episode 2: Maoni Stephens", excerpt, full video available at <<https://www.youtube.com/watch? v=OwpMnxl5FLw>>, 1 page, May 22, 2017.

"Memory barrier", retrieved from <<https://en.wikipedia.org/wiki/Memory_barrier>>, 4 pages, Dec. 18, 2018.

"Disruptor: High performance alternative to bounded queues for exchanging data between concurrent threads", retrieved from <<https://lmax-exchange.github.io/disruptor/files/Disruptor-1.0.pdf>>, 11 pages, May 2011.

Gabriel Kliot, et al., "A Lock-Free, Concurrent, and Incremental Stack Scanning for Garbage Collectors", retrieved from <<http://www.cs.technion.ac.il/~erez/Papers/sctack-scan-vee09.pdf>>, 2009, 10 pages.

Hao Wu, et al., "A Study of Lock-Free Based Concurrent Garbage Collectors for Multicore Platform", retrieved from <<https://www.ncbi.nlm.nih.gov/pmc/articles/PMC4100292/>>, 17 pages, Apr. 23, 2014.

Y. Ossia, et al., "A Parallel, Incremental and Concurrent GC for Servers", retrieved from <<http://www.cs.ucsb.edu/~ckrint/racelab/gc/papers/ossia-concurrent.pdf>>, 2002, 12 pages.

"Getting to Go: The Journey of Go's Garbage Collector", retrieved from <<https://blog.golang.org/ismmkeynote>>, Jul. 12, 2018, 47 pages.

"Fundamentals of Garbage Collection", retrieved from <<https://docs.microsoft.com/en-us/dotnet/standard/garbage-collection/fundamentals>>, Mar. 29, 2017, 15 pages.

"Memory page write detection on Windows & Linux", retrieved from <<https://stackoverflow.com/questions/7727461/memory-page-write-detection-on-windows-linux>>, Oct. 11, 2011, 6 pages.

"Full Garbage Collection vs. Major Garbage Collection", retrieved from <<https://stackoverflow.com/questions/50081873/full-garbage-collection-vs-major-garbage-collection>>, Apr. 29, 2018, 5 pages.

"How to avoid garbage collection Stop the World Events in IBM Java/JVM", retrieved from <<https://stackoverflow.com/questions/44550678/how-to-avoid-garbage-collection-stop-the-world-events-in-ibm-java-jvm>>, Jun. 14, 2017, 6 pages.

"Java very large heap sizes", retrieved from <<https://stackoverflow.com/questions/214362/java-very-large-heap-sizes/9300779#9300779>>, Sep. 17, 2014, 30 pages.

"f90_gc: Fortran Garbage Collector Module", retrieved from <<https://www.nag.com/nagware/np/r52_doc/f90_gc.html>>, no later than Jan. 19, 2019, 4 pages.

"Java GC safepoint", retrieved from <<https://stackoverflow.com/questions/19201332/java-gc-safepoint>>, Mar. 18, 2015, 4 pages.

"Runtime system", retrieved from <<https://en.wikipedia.org/wiki/Runtime_system>>, Sep. 24, 2019, 4 pages.

"Profiling (computer programming)", retrieved from <<https://en.wikipedia.org/wiki/Profiling_(computer_programming)>>, Aug. 7, 2019, 5 pages.

"Java Virtual Machine Tools Interface", retrieved from <<https://en.wikipedia.org/wiki/Java_Virtual_Machine_Tools_Interface>>, Oct. 15, 2013, 1 page.

\* cited by examiner

ENHANCED CONCURRENCY GARBAGE COLLECTION STACK SCANNING

BACKGROUND

Noon In computer program execution, garbage collection activities help provide automatic memory management. The "garbage" in question is memory space which was allocated to a program for use, is no longer needed by that program, but is not yet available for use by other programs. A garbage collector is software that is designed to identify such areas of memory so they can be reclaimed for subsequent re-allocation.

Garbage collection can free programmers from the need to manually release data objects that are no longer needed, thus making programming easier. Garbage collection can also help prevent some runtime errors, thereby enhancing cybersecurity by improving the integrity and availability of data. Many programming languages either require garbage collection, or else allow garbage collection as an option. Some software development environments allow both automatic garbage collection and manual memory management during the execution of a given program.

Efficient implementation of garbage collection can be a high priority because garbage collectors may run frequently or run at unpredictable times, or both, and garbage collection may significantly slow down application program execution. Indeed, most if not all garbage collectors sometimes utilize a stop-the-world approach which prevents application programs from running at the same time as the garbage collector. Programs do not respond to input while they are stopped this way, so both the measured efficiency of an application program and its responsiveness as perceived by users may be reduced by garbage collection. However, merely reducing the amount of processing time spent on garbage collection may also reduce the amount of memory reclaimed, and thus hamper application program performance in other ways, e.g., by increasing the time spent swapping data between volatile and non-volatile memory devices.

SUMMARY

Some embodiments described in this document provide improved garbage collection (GC) in computing systems. In particular, some embodiments embed behavior-driven stack scan optimization (BDSSO) functionality within a system. The BDSSO functionality reduces stop-the-world time by increasing the concurrency of application program execution with stack scanning activity of a garbage collector. The application program may still be stopped during some of the GC stack scanning, but BDSSO makes it possible to safely and efficiently let the application program continue to run while an evidently constant (for at least the expected stack scanning time) portion of the application's execution stack is scanned for GC.

Some enhanced concurrency embodiments described herein include or are in operable communication with a memory and a processor. The memory is configured by the execution stack of a program; the execution stack includes execution frames of the program over a time period of interest. The memory is also configured by behavior-driven stack scan optimization (BDSSO) software. The processor is in operable communication with the memory, and is configured to execute the BDSSO software to perform BDSSO steps which include (a) obtaining execution stack frame occurrence data, (b) determining from the execution stack frame occurrence data, for each of a plurality of execution frames, a respective frame execution likelihood, (c) selecting a stack scan depth based at least in part on the frame execution likelihoods, the selected stack scan depth being less than a full depth of the entire execution stack, (d) installing a garbage collection scan return barrier at the selected stack scan depth, and then (e) allowing a tracing garbage collector to scan the execution stack below the scan return barrier while the program is also running.

In some of these embodiments, the scan return barrier placement is selected to reduce the risk that the program will hit the scan return barrier while the garbage collector scans the execution stack. Thus concurrency is increased by performing the BDSSO steps, because the program runs concurrently with the garbage collector while the garbage collector scans the execution stack below the scan return barrier, unless the program executes a frame return operation that hits the scan return barrier. In that case program execution is suspended while the garbage collector responds to the program's movement into a part of the execution stack that was assumed to be constant during the scanning.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
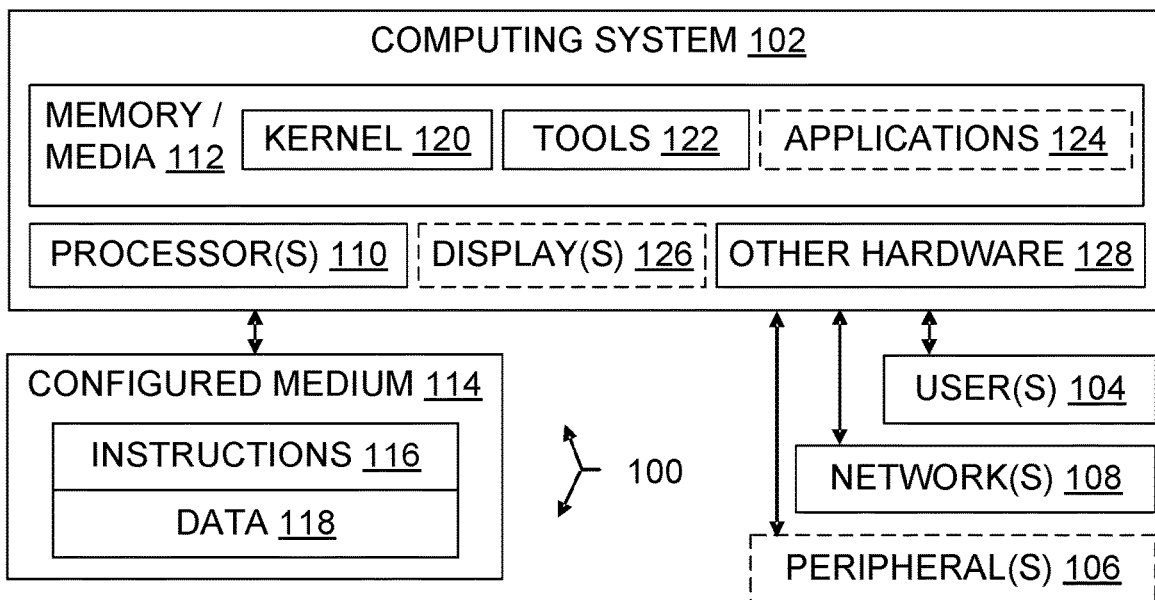
FIG. 1 is a block diagram illustrating computer systems generally and also illustrating configured storage media generally.
Figure 2:
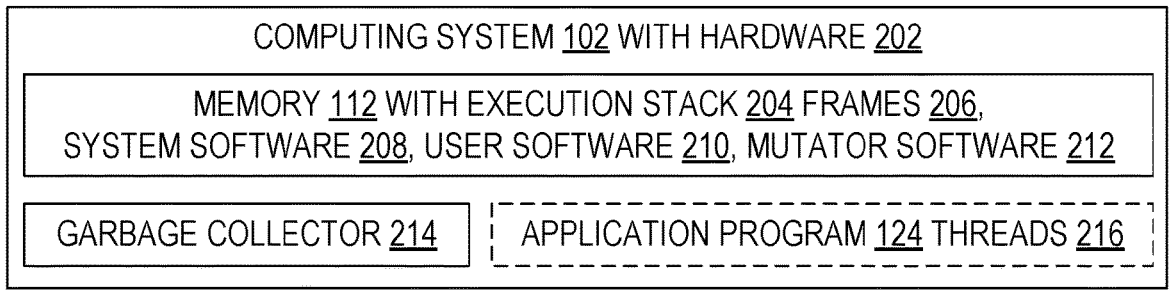
FIG. 2 is a block diagram illustrating a computing system which includes hardware, and also includes a garbage collector and other software.
Figure 3:
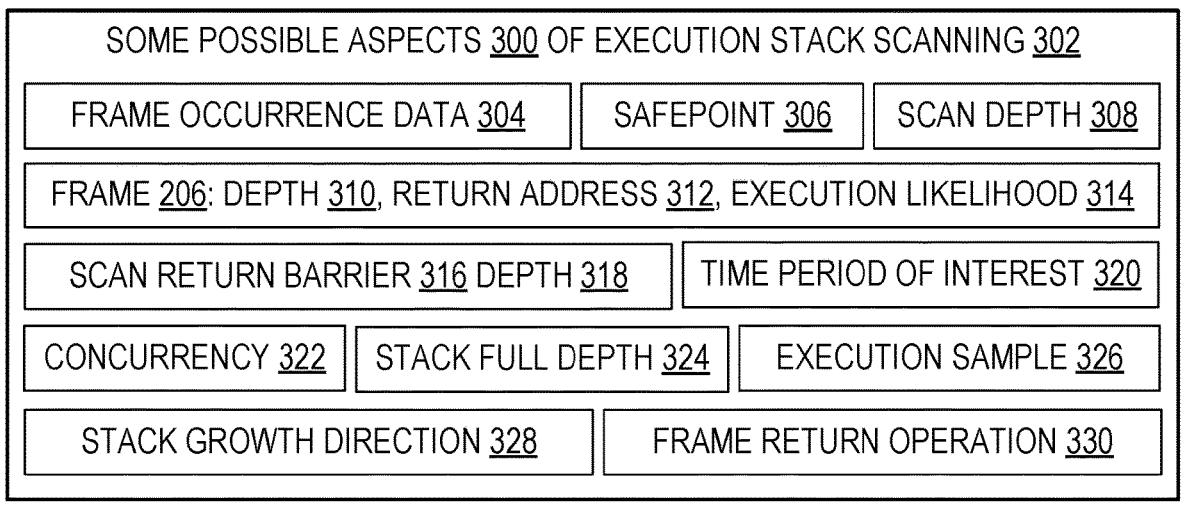
FIG. 3 is a block diagram illustrating some aspects of execution stack scanning for garbage collection.
Figure 4:
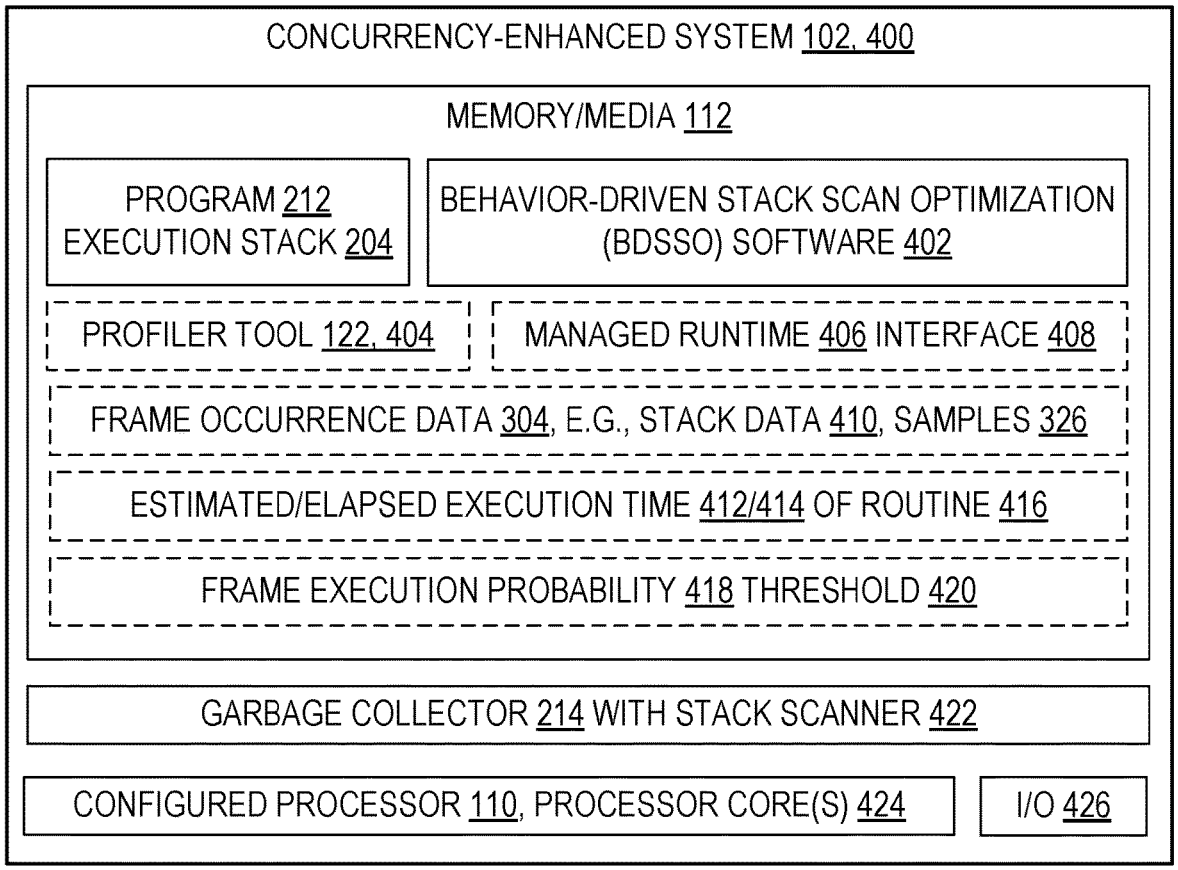
FIG. 4 is a block diagram illustrating aspects of a system which is configured with concurrency enhancement functionality.
Figure 5:
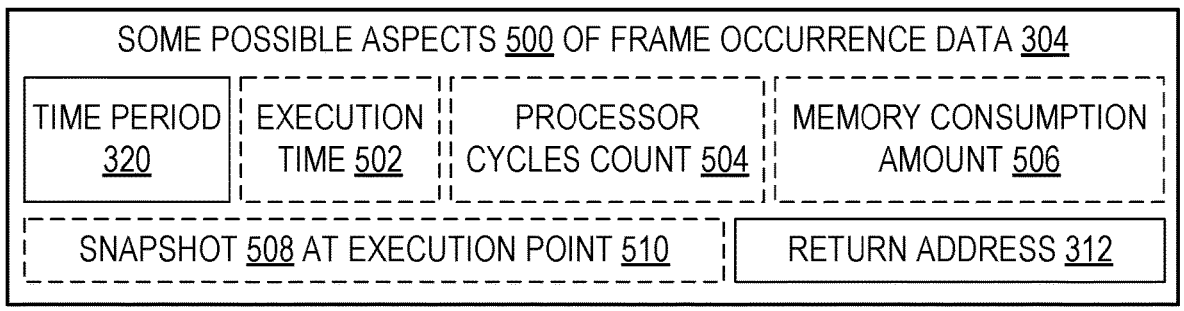
FIG. 5 is a block diagram illustrating some aspects of some frame occurrence data.

Innovations may expand beyond their origins, but understanding an innovation's origins can help one more fully appreciate the innovation. In the present case, some teachings described herein were motivated by technical challenges faced by a Microsoft innovator who was working to improve the performance of Microsoft managed runtime offerings. Such offerings include, for example, managed software frameworks for Microsoft Windows®, various Linux® and other *nix, and Apple macOS® operating system environments, as well as some Java® and JavaScript® virtual machine environment offerings, and also many offerings in Azure® and other cloud environments (marks of Microsoft Corporation, Linus Torvalds, Apple Inc., Oracle America, Inc., Oracle America, Inc., and Microsoft Corporation, respectively).

In particular, a technical challenge was to how to improve the responsiveness of programs that are suspended during garbage collection. An emergent challenge was how to increase the concurrency of garbage collection stack scanning with execution of the application program or other software that uses the memory that is being managed with a garbage collector. Such programs may modify their object graphs over time, and hence they are referred to in garbage collection terminology as "mutators". A stack is a digital artifact used by a computer program to track usage of functions, which are basic building blocks of almost any modern program. A program may have one or more stacks; for example, each processor core of a computing system may execute a separate thread which has its own respective thread stack.

Garbage collectors scan mutator program stacks to identify pieces of memory that may be reclaimable, so changes made in the stack during such identification activities can lead to data corruption, program crashes, and other undesirable results. Specifically, tracing garbage collectors use the stack as part of root scanning to identify which objects are alive and then treat the rest of the objects as reclaimable. Thus, the safest approach would be to suspend execution of everything except the garbage collector while the stack is being scanned (that is, while the stack is used by a tracing garbage collector during root scanning) and potentially reclaimable memory is being identified. However, this naïve approach suspends mutators longer than is necessary in some situations, so other approaches are sometimes used instead. In particular, some approaches try to reduce stop-the-world time imposed on mutators, by reducing the amount of the stack that is scanned while the mutator is suspended.

One approach, for example, only suspends the mutator while the top (i.e., first, most recent) execution frame of the mutator's stack is being scanned. The mutator is then allowed to run concurrently with the garbage collection stack scanner after the top frame has been scanned. A scan return barrier is placed below the top frame, so that the garbage collector again gets exclusive control if the mutator attempts to change anything below the top frame. Depending on factors such as the overhead associated with stopping the mutator, and how often the mutator accesses a frame below the top frame, this top-frame-only stop-the-world approach does not necessarily improve mutator performance, and may sometimes degrade mutator performance.

Some embodiments described herein obtain stack activity data of a computing system and from that data determine how likely it is that particular frames near the top of the stack will change while the stack is being scanned. A scan return barrier is placed accordingly in the stack. The mutator is suspended while the frames most likely to change are scanned, and then the mutator and the stack scanner run concurrently while the rest of the stack is scanned, unless the mutator tries to access the stack below the scan return barrier. In that event, the mutator is suspended again, and the relevant frame or frames are scanned. The scan barrier may be repositioned, reinstalled at the same location, or removed entirely. Even if the initial scan barrier placement is not a correct prediction of which frames will remain unchanged during stack scanning, placing the scan barrier based on stack activity as taught herein instead of always placing the scan barrier at a fixed location tends to increase concurrency of the system.

Some embodiments described herein may be viewed by some people in a broader context. For instance, concepts such as access, concurrency, execution, management, memory, reclamation, and suspension may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to increase the opportunities for concurrent execution of a mutator and a stack scanner in a computing system. Other configured storage media, systems, and processes involving access, concurrency, execution, management, memory, reclamation, or suspension are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular motivating examples, managed memory environments, operating systems, programming languages, software processes, development tools, identifiers, data structures, notations, control flows, pseudocode, naming conventions, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as scanning an execution stack of a program, suspending execution of software, redirecting a software function return operation, and installing a scan return barrier in an execution stack, which are each activities deeply rooted in computing technology. Some of the technical mechanisms discussed include, e.g., scan return barriers, execution stacks, garbage collection safepoints, program profiling samples, and concurrency enhancements. Some of the technical effects discussed include, e.g., an increased likelihood that a mutator and a stack scanner will run concurrently with one another, and improved responsiveness of programs that run in memory managed environments. Thus, purely mental processes are clearly excluded. Other advantages based on the technical characteristics of the teachings will also be apparent to one of skill from the description provided.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit

API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
ID: identification or identity
IoT: internet of things
LAN: local area network
OS: operating system
PaaS or PAAS: platform-as-a-service
RAM: random access memory
ROM: read only memory
UEFI: Unified Extensible Firmware Interface
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following:

environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Concurrency enhancement operations such as determining stack frame execution likelihoods, installing a scan return barrier, and many other operations discussed herein, are understood to be inherently digital. A human mind cannot interface directly with a CPU or other processor, or with RAM or other digital storage, to read and write the necessary data to perform the concurrency enhancement steps taught herein. This would all be well understood by persons of skill in the art in view of the present disclosure, but other people may sometimes need to be informed of this, or reminded of it.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as analyzing, comparing, computing, creating, determining, displaying, enhancing, executing, gathering, generating, indicating, installing, locating, maintaining, mitigating, modifying, obtaining, operating, performing, predicting, providing, reading, receiving, reducing, removing, replacing, running, sampling, scanning, selecting, storing, tallying, using, utilizing, varying, writing (and analyzes, analyzed, compares, compared, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

Figure 7:
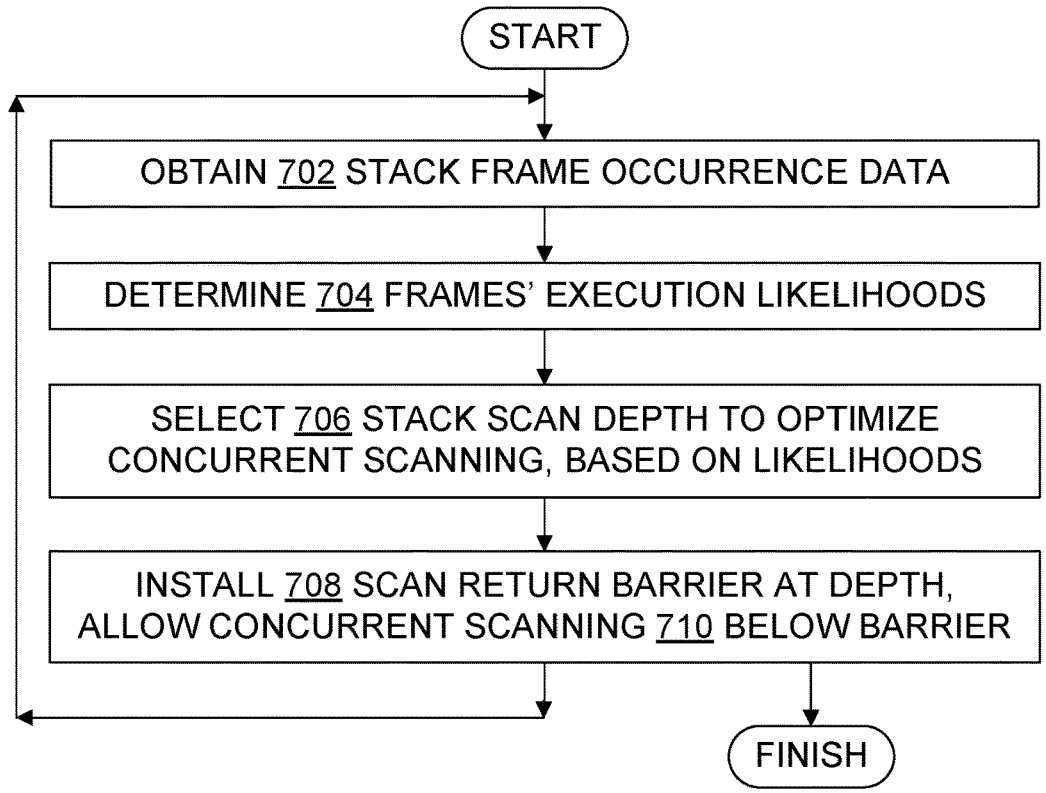
FIG. 7 is a flowchart illustrating steps in some concurrency enhancement methods.
Figure 8:
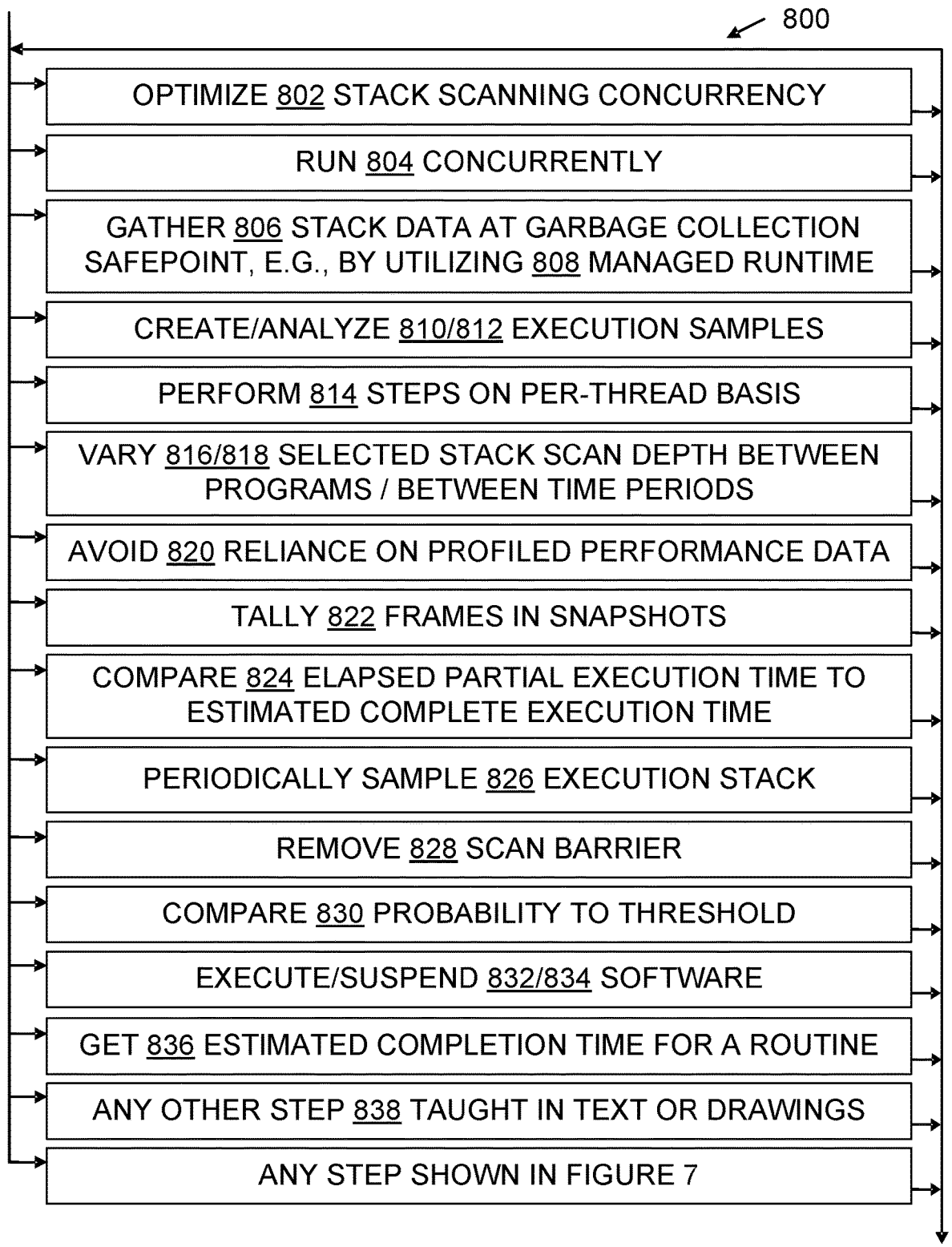
FIG. 8 is a flowchart further illustrating steps in some concurrency enhancement methods.

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, debuggers, profilers, compilers, interpreters, decompilers, assemblers, disassemblers, source code editors, autocompletion software, simulators, fuzzers, repository access tools, version control tools, optimizers, collaboration tools, software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
202 computing hardware generally, including hardware associated with one or more of the reference numbers 106, 108, 110, 112, 114, 126, 128, 424
204 execution stack; may also be referred to simply as a "stack"
206 execution stack frame; may also be referred to as a "stack frame" or simply as a "frame"
208 system software, e.g., kernel 120
210 user software, e.g., applications 124
212 mutator software, namely, software that may mutate part of a stack; mutator software may be system software or user software
214 garbage collector software; may also be referred to as a "garbage collector" or "GC"
216 thread, i.e., execution thread in a computer program
300 aspect of execution stack scanning for garbage collection
302 execution stack scanning for garbage collection; may also be referred to as "stack scanning" or simply as "scanning"; also refers to performing stack scanning
304 frame occurrence data, namely, data which indicates occurrences of frames
306 garbage collection safepoint; may also be referred to simply as "safepoint"
308 actual scan depth, e.g., depth in stack down to which stop-the-world scanning of frames is actually pursued
310 frame depth generally, e.g., top of stack is at depth zero, one frame below the top of stack is at depth one, etc., with the understanding that this example uses zero-indexing but other examples may use one-indexing such that the top of stack frame is at depth one, the next frame down is at depth two, and so on
312 frame return address; may also be referred to as "return address"; indicates the address to which processing control is transferred when the function or other routine corresponding to a frame containing that return address is done executing and the system is ready to pop that frame off the stack and transfer control to the indicated return address
314 frame execution likelihood, namely, a probability or other value (e.g., Boolean isLikely or isNotLikely) indicating the computed likelihood that a frame will be accessed by a mutator while the mutator's stack is being GC scanned; may also be referred to as "execution likelihood"
316 scan return barrier; a scan return barrier may be implemented, e.g., by hijacking a frame return address, that is, an embodiment saves the return address, replaces it in the frame with an address of GC scan return barrier code which does, e.g., stack scanning, and when the scan return barrier code is done it removes its own address from the frame and lets control transfer according to the restored return address; scan return barrier operation contrasts with a write barrier that operates primarily to intercept a write, e.g., to log what is being written and where, and also contrasts with a read barrier that operates primarily to intercept a read, e.g., when a thread wants to update a variable before the variable's value is read, although logs or updates or both may also be done by scan return barrier code
318 stack depth of an installed scan return barrier; unless otherwise stated, "scan depth" herein refers to this predicted scan depth 318 as opposed to the actual scan depth 308
320 time period of interest
322 concurrency of GC execution (including in particular stack scanning) with execution of other software (especially mutator software)
324 stack full depth, e.g., number of total frames in a given stack, including frames above a scan return barrier and also including frames below the scan return barrier
326 execution sample, e.g., including data about a stack at a particular point in time
328 stack growth direction; for convenience, discussions herein including the claims are phrased for a stack that grows upward in memory, with the most recent frames on or near the top of the stack and the oldest frames at or near the bottom of the stack, but one of skill will acknowledge that some stack implementations are reversed in that their stacks grow downward; teachings herein apply with stacks that grow in whichever direction (e.g., upward, downward, or sideways)
330 frame return operation, e.g., transferring processing control to the instructions located at the return address
400 system equipped with concurrency enhancement functionality
402 behavior-driven stack scan optimization (BDSSO) software, e.g., software which performs a method 700 or a method 800 or which otherwise employs a scan return barrier at varied stack depths based on mutator stack activity
404 profiler tool; may also be referred to as a "performance profiler" or simply as a "profiler"
406 managed runtime, namely, a runtime which provides memory management using automatic garbage collection
408 interface, e.g., API, to a managed runtime
410 stack data generally
412 estimated execution time for complete execution of a routine, or for completing execution of the routine
414 elapsed time spent executing a routine
416 routine, e.g., function
418 frame execution probability, e.g., a floating point numeric value in the range of zero to one representing the calculated probability that a frame will be execution during stack scanning
420 frame execution probability threshold; may be set by an administrator or other user, or may be chosen by machine learning inference or statistical modeling, for example
422 execution stack scanner; for present purposes this scanner is considered part of a garbage collector 214, although in other contexts a distinction may be made between GC code and stack scanner code
424 processor core
426 software or hardware or both which form an interface to the system 400 which allows I/O
500 aspect or characteristic of frame occurrence data
502 elapsed execution time for a given piece of software or a given portion of program execution
504 processor or processor core cycle count 506 memory consumption amount or data from which a memory consumption amount is calculable, e.g., by calculating a difference between locations of pairs of adjacent frames 508 snapshot containing frame occurrence data at a particular point in an execution of a program 510 particular point in an execution of a program; may be represented, e.g., as the location of the most recently executed machine instruction, or as a cycle count, or by another measure of program execution 602 top of stack 604 frames above scan return barrier 700 flowchart; 700 also refers to concurrency enhancement methods illustrated by or consistent with the FIG. 7 flowchart 702 obtain stack frame occurrence data 704 determine likelihood of stack frame executing during GC stack scan 706 select stack scan depth, i.e., select location in stack where scan return barrier will be installed 708 install scan return barrier, e.g., by saving frame's current return address and replacing it with address of GC software that suspends mutator and scans frame(s) before transferring control to instructions at saved return address 710 allow perform stack scanning to be done concurrently (at least in part) with mutator execution 800 flowchart; 800 also refers to concurrency enhancement methods illustrated by or consistent with the FIG. 8 flowchart (which incorporates the steps of FIG. 7)

802 optimize stack scanning concurrency by selecting stack depth and installing scan return barrier based on predicted stack activity 804 run concurrently, e.g., execute mutator and stack scanner concurrently 806 gather stack data 808 utilize a managed runtime, e.g., through interaction with a managed runtime interface 408

810 create an execution sample 812 computationally analyze execution samples 814 perform concurrency enhancement steps thread-by-thread for two or more threads 816 vary selected scan depth (i.e., scan return barrier position) between programs, or perform instructions resulting in such variation 818 vary selected scan depth (i.e., scan return barrier position) between executions of a given program, or perform instructions resulting in such variation; in addition to varying 816 scan depth between programs or varying 818 scan depth between executions of a given program, in some embodiments the scan depth for each thread is determined and adjusted over the course of a single execution of a single program 820 avoid reliance on profiled performance data when selecting 706 scan return barrier position 822 tally frames in snapshots of stacks 824 compare a routine's elapsed partial execution time to an estimated total execution time, or use an estimated time to completion of the routine 826 sample an execution stack at regular intervals; this may be done, e.g., using operating system level sampling such as sampling with Event Tracing for Windows (ETW) in Microsoft Windows® environments or with pert in Linux® environments or with other tools which are runtime agnostic, or sampling may be done through a particular runtime, e.g., through a Java® or other virtual machine (marks of Microsoft Corporation, Linus Torvalds, Oracle America Inc., respectively)

828 remove an installed scan return barrier, e.g., by replacing it with a return address which the barrier replaced 830 compare a frame execution probability to a probability threshold 832 execute software; refers to execution generally as well as any particular examples of software execution provided herein 834 suspend software execute, e.g., during a stop-the-world portion of garbage collection 836 get an estimated completion time for completing execution of the routine, e.g., based on the number of remaining instructions before the return address, or a history of measurements of the routine's execution time 502

838 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Some embodiments use or provide a concurrency-enhanced system, such as the example system 400 or another system 102 that is enhanced as taught herein. The concurrency-enhanced system includes an execution stack 204 of a program 212. The execution stack includes execution frames 206 over a time period 320 of interest. A memory 112 of the concurrency-enhanced system is configured by the execution stack, and the memory 112 is also configured by behavior-driven stack scan optimization (BDSSO) software 402. A processor 110 of the concurrency-enhanced system is in operable communication with the memory. The processor 110 is configured to execute the BDSSO software 402 to perform BDSSO steps which include (a) obtaining execution stack frame occurrence data 304, (b) determining from the execution stack frame occurrence data, for each of a plurality of execution frames 206, a respective frame execution likelihood 314, (c) selecting a stack scan depth 318 based at least in part on the frame execution likelihoods, the selected stack scan depth being less than a full depth 324 of the entire execution stack, (d) installing a garbage collection scan return barrier 316 at the selected stack scan depth, and then (e) allowing a tracing garbage collector 214 to scan the execution stack below the scan return barrier while the program 212 is running. System concurrency is increased by performing the BDSSO steps, because the program 212 runs concurrently with the garbage collector 214 while the garbage collector scans the execution stack below the scan return barrier, unless the program executes a frame return operation 330 that hits the scan return barrier.

For example, in some embodiments the frames 206 above the return barrier 316 are scanned while an application thread 216 is stopped, but the rest of the stack can be scanned while the application 124 is running. Multi-threaded applications are examples of mutator programs 212. The return barrier allows an embodiment to concurrently scan the part of the stack below the barrier without incurring a risk that a stack change will go undetected during the scan. The full stack would be scanned with or without the BDSSO software, but with BDSSO less of the scanning is done while the thread 216 is stopped.

One way to obtain the stack frame occurrence data is to use existing profiler samples, making the samples do double duty. Thus, some embodiments include execution samples 326 created by a performance profiler tool 404 during an execution of the program 212. The profiler 404 is designed to generate samples for performance reporting, but in some embodiments the BDSSO software 402 obtains the execution stack frame occurrence data at least in part by analyzing the execution samples. In particular, the samples will contain frames 206 with return addresses 312. However, because the profiler samples are designed for program performance profiling, as opposed to garbage collection concurrency enhancement, the samples 326 will often contain performance data that is not used for garbage collection concurrency enhancement, e.g., processor cycle counts 504 or other execution time measurements 502, and memory consumption data 506 or its computational underpinnings.

Another way to obtain the stack frame occurrence data 304 is to utilize a managed runtime 406. For example, some embodiments obtain stack frame data 410 through a Java® Virtual Machine Tool Interface (JVMTI) (mark of Oracle America, Inc.). By design, this interface 408 may be used to obtain stack data which includes profiling samples obtained at garbage collection safepoints 306. This can be somewhat disadvantageous for performance profiling (the intended use of the samples) because safepoints may not be located at regular intervals during program execution, or may not be located at the fine granularity desired. However, sampling at safepoints is actually helpful for concurrency enhancement as taught herein, because stack behavior at garbage collection safepoints is highly relevant to predicting which part of a stack is likely to remain stable while the garbage collector scans the stack.

Accordingly, some enhanced concurrency system embodiments include a managed runtime 406, and the BDSSO software 402 obtains the execution stack frame occurrence data 304 at least in part by gathering 806 stack data 410 at garbage collection safepoints 306 utilizing the managed runtime.

As noted, one familiar approach has been to suspend 834 a mutator 212 while scanning the top frame only, at least as an initial positioning of the scan return barrier. With the benefit of teachings herein, this approach can be seen as one that always sets the scan return barrier below the first frame of the stack, regardless of which program 212 is involved and regardless of any variations in program behavior from one execution of a program to another execution of that program. By contrast, in some embodiments taught herein, the enhanced system is characterized by differing from a fixed depth stack scanning system in at least one of the following ways: the garbage collection scan return barrier 316 is installed below at least two frames of the execution stack; the system has a plurality of programs 212, and the selected stack scan depth 318 varies between programs; or the selected stack scan depth 318 varies for different time periods of interest 320 for a given program 212, even within a single execution of the given program.

In some embodiments, the enhanced system improves concurrency between GC stack scanning and a mutator that does not contain multiple threads. However, other embodiments apply the teachings herein to multi-thread programs 212. In particular, in some embodiments a processor running the program 212 has N cores 424, with N being at least two, and the program 212 has M threads 216 with 2<=M<=N. Each thread 216 has a respective execution stack 204, and the BDSSO software 402 performs the BDSSO steps on a per-thread basis 814 for each of the M threads. That is, the BDSSO software places one scan return barrier per thread for garbage collection on behalf of the garbage-collected threads, and different garbage-collected threads may have different respective scan return barrier depths 318. Some threads of a given program 212 may be garbage-collected whereas other threads of that program are not.

As noted, although profiler samples can be used (or re-used) to obtain frame occurrence data 304 for concurrency enhancement by selective and adaptive scan return barrier placement, some embodiments also work fine with less sample data than a profiler relies on. For example, in some embodiments, the execution stack frame occurrence data 304 includes return addresses 312 and the execution stack frame occurrence data 304 is free of each of the following: data 502 stating an elapsed execution time, data 504 stating a processor cycles count, and data 506 stating a memory consumption amount or underlying calculation of a memory consumption amount. In some, the data 502, 504, 506 is available to the BDSSO software 402 but is not relied upon by the BDSSO software or calculated by the BDSSO when determining frame execution likelihood 314 or when selecting a scan return barrier location 318. In some, the stack frame occurrence data 304 is free of data 502 and also free of data 504.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. Embodiments are not limited to the specific examples of component names, optimizations, algorithmic choices, sample 326 content, stack implementations, approaches, or scenarios provided herein. A given embodiment may include additional or different technical features, mechanisms, sequences, data structures, or functionalities for instance, and may otherwise depart from the examples provided herein.

Processes (a.k.a. Methods)

FIG. 7 illustrates a method 700 which is an example of methods that may be performed or assisted by an enhanced system, such as system 400 or another concurrency-enhanced system as taught herein. FIG. 8 further illustrates concurrency enhancement methods (which may also be referred to as "processes" in the legal sense of that word) that are suitable for use during operation of a system 400 or other system which has innovative functionality taught herein. FIG. 8 includes some refinements, supplements, or contextual actions for steps shown in FIG. 7. FIG. 8 also incorporates steps shown in FIG. 7. Technical processes shown in the Figures or otherwise disclosed will be performed automatically, e.g., by an enhanced garbage collector 214, unless otherwise indicated. Processes may also be performed in part automatically and in part manually to the extent action by a human administrator or other human person is implicated, e.g., in some embodiments a human administrator may specify a frame execution probability threshold 420. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 7 and 8. Steps may be performed serially, in a partially overlapping manner, or fully in parallel. In particular, the order in which flowchart 700 action items or flowchart 800 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a concurrency enhancement method for optimizing execution stack tracing for garbage collection, including the following steps: obtaining 702 execution stack frame occurrence data for an execution stack; automatically determining 704 from the execution stack frame occurrence data, for each of a plurality of execution frames, a respective frame execution likelihood; automatically selecting 706 a stack scan depth based at least in part on the frame execution likelihoods, the selected stack scan depth being less than a full depth of the entire execution stack; automatically installing 708 a garbage collection scan return barrier at the selected stack scan depth; and allowing 710 the tracing garbage collector to scan 302 the execution stack only to the selected stack scan depth. Concurrency is increased 802 by performing the method, by virtue of an execution 832 of a garbage collector stack scanning software happening concurrently 804 with an execution 832 of a mutator software, in comparison to scanning the execution stack for garbage collection without performing the method.

Figure 6:
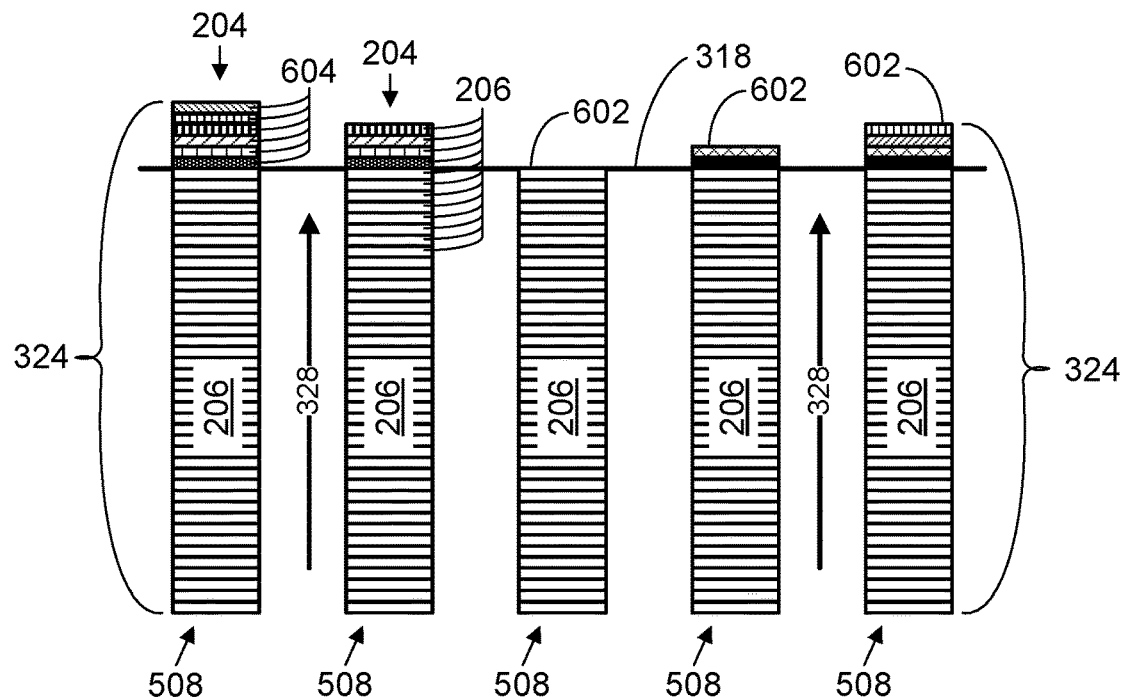
FIG. 6 is a diagram illustrating some aspects of some execution stack snapshots.

Some embodiments determine frame execution likelihood using a window of stack frame presence snapshots. Each snapshot 508 includes a set of execution frames. A goal of snapshot analysis 812 is to find a location 318 in the stack for which everything below that point remains unchanged (or mostly unchanged) between sample sets, i.e., between snapshots. In some embodiments, the execution stack frame occurrence data 304 includes stack frame snapshots 508 for different points 510 during execution of a program 212, and determining 704 a frame execution likelihood 314 includes tallying 822 how many times a particular set of execution frames occurs in a set of stack frame snapshots. For instance, in the example shown in FIG. 6, some of the frames 206 of the five snapshots 508 shown changed between snapshots, while others did not change. Time progresses from left to right in FIG. 6. In this example, the scan barrier depth 318 is set just above the non-changing frames 206, below all of the frames 604 that showed change.

More generally, in some embodiments if a frame F does not appear in all of the last N samples then the embodiment does not attempt to scan frame F concurrently with mutator execution. In the FIG. 6 example, the top four frames of the rightmost (most recent) stack do not appear in all of the last 5 (N=5) samples (snapshots), so those four frames are above the concurrent scanning cutoff 318. Frames below the cutoff depth 318 do all appear in the last 5 snapshots, and the garbage collector will accordingly try to scan them while running concurrently with the mutator that produced the 5 sampled stacks 204.

In some embodiments, another way to determine 704 frame execution likelihood uses estimated routine execution length data. In some, determining 704 a frame execution likelihood includes at least one of the following: comparing 824 an elapsed execution time 414 for a partial execution of a routine 416 to an estimated execution time for a complete execution of the routine, or getting 836 an estimated completion time 412 for completing execution of the routine.

In some embodiments, one way to obtain 702 stack frame occurrence data is by periodically sampling 826 the execution stack during execution of a program. Other embodiments may perform sampling at pseudorandom intervals, or other non-periodic sampling.

The benefits of concurrency enhancement as taught herein may be particularly large when a program 212 has deep stack 204 with most of the activity in the top few frames. For example, in some embodiments, the execution stack frame occurrence data 304 includes stack frame snapshots 508 for different points during execution of a program 212, with a majority of the snapshots each showing a stack depth 324 of at least one hundred frames 206, but the selected stack scan depth 318 being is less than ten and more than one.

In some embodiments, determining 704 the frame execution likelihood and selecting 706 the stack scan depth is performed without 820 reading or otherwise relying on any of the following: data 502 stating an elapsed execution time for any stack frame, data 504 stating a processor cycles count for any stack frame, or data 506 stating a memory consumption amount for any stack frame.

In some embodiments, obtaining 702 execution stack frame occurrence data includes obtaining execution samples created by a profiler tool. In some, obtaining 702 execution stack frame occurrence data includes utilizing 808 a managed runtime for profiling at garbage collection safepoints.

In some embodiments, the method finds at least one thread whose stack samples have a recurring set of frames. In particular, the mutator software includes an application program 124, and the method includes performing at least the obtaining 702, determining 704, selecting 706, and installing 708 with each of a plurality of execution stacks of respective threads 216 on a per-thread basis for at least two threads of the application program.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as frame occurrence data 304, scan return barrier depths 318, execution likelihoods 314, and BDSSO software 402, in the form of data 118 and instructions 116, read from a removable storage medium 114 and/or another source such as a network connection, to form a configured storage medium. The configured storage medium 112 is capable of causing a computer system 102 to perform technical process steps for concurrency enhancement, as disclosed herein. The Figures thus help illustrate configured storage media embodiments and process (a.k.a. method) embodiments, as well as system and process embodiments. In particular, any of the process steps illustrated in FIG. 7 or 8, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a concurrency enhancement method of optimizing execution stack tracing for garbage collection. This method includes: obtaining 702 execution stack frame occurrence data for an execution stack of a program; automatically determining 704 from the execution stack frame occurrence data, for each of a plurality of execution frames, a respective frame execution likelihood; automatically selecting 706 a stack scan depth based at least in part on the frame execution likelihoods, the selected stack scan depth being less than a full depth of the entire execution stack; automatically installing 708 a garbage collection scan return barrier at the selected stack scan depth; and allowing 710 the tracing garbage collector to scan the execution stack only to the selected stack scan depth; whereby concurrency of garbage collection stack scanning with program execution is increased 802 by performing the method.

In some embodiments, the program 212 hits the scan return barrier while executing 832, and the method further includes removing 828 the scan return barrier, automatically selecting 706 a different stack scan depth (e.g., one further down the stack), and automatically installing 708 the scan return barrier at the different stack scan depth. Instead of selecting a depth one frame deeper, some embodiments select one K frames deeper, where K is set by an administrator, or K may be determined dynamically, e.g., as a truncated fraction of the removed depth, e.g., set K to the next whole number greater than or equal to the removed depth divided by four.

In some embodiments, the execution stack corresponds to a thread of a program 212, and the method repeats the selecting 706 and installing 708 with different stack scan depths 318 at different times during execution of the thread, but each time the garbage collection scan return barrier is installed below at least two frames of the execution stack. In some of these embodiments, the execution stack frame occurrence data 304 includes stack frame snapshots 508 for different points during execution of the program, at least 80% of the snapshots each show a stack depth of at least eighty frames, and the selected stack scan depth is less than nine.

In some embodiments, determining 704 a frame execution likelihood includes comparing 830 a frame execution probability 418 to a frame execution probability threshold 420. For instance, if a frame F appears in four of the most recent ten stack snapshots, the frame's probability 418 could be calculated as 0.4, and if the threshold 420 for placing the scan return barrier below a frame is set at 0.2, then comparing 0.4 to 0.2 yields a likelihood 314 of LikelyToChange which is too high to include the frame F in the concurrent scanning lower portion of the execution stack.

Additional Examples and Observations

One of skill will recognize that not every part of this disclosure, or any particular details therein, are necessarily required to satisfy legal criteria such as enablement, written description, or best mode. Also, embodiments are not limited to the particular networks, protocols, tools, identifiers, fields, data structures, functions, or other implementation choices. Any apparent conflict with any other patent disclosure, even from the owner of the present innovations, has no role in interpreting the claims presented in this patent disclosure. With this understanding, which pertains to all parts of the present disclosure, some additional examples and observations are offered.

With the benefit of teachings provided herein, one of skill may view garbage collection according to various characterizations. For example, stack tracing, low latency with shorter STW times, concurrent stack scanning and mutator execution for better mutator responsiveness, fixed count frame scanning during STW, dynamic count frame scanning based on actual stack activity, and other characteristics may be identified in familiar garbage collectors or innovative garbage collectors, or in some cases in both. In particular, one of skill will acknowledge that a given implementation may operate according to new teachings herein in some aspects or at some times and also operate in familiar ways in other aspects or at other times.

Some embodiments provide or use intelligent partial stack scanning for concurrent garbage collection. By way of context, a tracing garbage collector 214 operates by walking a graph of objects to determine which ones are reachable (and therefore which ones are unreachable and can be treated as garbage). Tracing collectors start their marking process with a set of roots and then traverse the transitive closure of their references. Roots are objects that are assumed to be reachable. Root identifications come from a few places, including the execution stack. Scanning the stack for roots can be expensive because stacks in real world programs can be quite deep, with many activation frames 206 to traverse. Concurrent garbage collectors try to minimize the time that application threads have to be paused, so reducing the amount of time stack scanning takes is important to them.

Some mitigation approaches to concurrent stack scanning scan only the executing frame—the top frame—in a stop-the-world (STW) pause and then let the app 124 resume. Such an approach may set up a stack barrier so that if the app tries to return to the previous frame, the system re-enters STW. Some mitigation approaches scan only the executing frame but when the mutator thread tries to go to an unscanned frame, they make that mutator thread help the GC by doing the marking work for that frame before running user code again. Some mitigation approaches split the stack into fixed-size sections and scan one section at a time. One thing these mitigation approaches share is that they scan all, one, or some other pre-determined number of frames in STW without consideration of recent stack activity or any use of past stack activity to attempt to predict which frames the mutator will try to enter during stack scanning.

In contrast, some embodiments presented here build on concurrent stack scanning by making such predictions, in the form of selecting the scan return barrier depth dynamically. Instead of predetermining how much of the stack the GC will scan in STW ahead of time, some embodiments will adjust dynamically by using sampling information to make an intelligent guess that balances resources spent making the guess 318 against likely increased concurrency.

For example, by periodically sampling the execution stacks in the running process, some embodiments can pick up on some patterns that inform such guesses 318. For instance, assume the sampling shows an execution pattern where a thread has a very deep stack (hundreds of frames) but only the top 6 frames are changing between the samples. After seeing this pattern for a sufficiently long time (e.g., four consecutive snapshots), the enhanced system infers that the probability of needing to return out of the 7th frame in an upcoming GC is low, making that depth a good place to set up a return barrier and to perform concurrent scanning below that depth.

If the guess proves correct, the enhanced system will get the advantages of concurrent stack scanning while reducing the likelihood of a mutator thread running into scanning-related delays. If the guess proves incorrect and the function does indeed hit the stack barrier during the stack scan, then an enhanced system may attempt a guess again, or it may employ existing mitigation approaches used with stack barriers.

One of skill will understand that embodiments described herein may have various technical advantages over other approaches. For example, some existing solutions for partial stack scanning use pre-determined notions of how much of the stack to scan while an application thread is stopped. This one-size-fits-all approach can lead to inefficiency, e.g., when a GC scans more frames during the pause than the thread would have returned through during that time, the GC will have needlessly lengthened the thread's pause time. If the GC scanner 422 chose to scan too few frames during the pause, the thread might run into the stack barrier after the pause and have to do more waiting and more coordination with the GC. Some embodiments presented here avoid both of those adverse results by determining the number of non-concurrently scanned frames at runtime based on program behavior.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

CONCLUSION

In short, garbage collection (GC) to reclaim memory 112 in computing systems 102 sometimes suspends 834 applications 124, web services, and other mutator programs 212 in order to scan 302 their execution stacks 204, which reduces their responsiveness. But suspension times are decreased 802 by behavior-driven stack scan optimization (BDSSO) functionality such as BDSSO software 402 that increases the concurrency 322 of mutator 212 execution 832 with GC stack scanning. BDSSO obtains 702 execution stack frame occurrence data 304, determines 704 frame execution likelihoods 314, selects 706 a stack scan depth 318 based on the likelihoods, and installs 708 a scan return barrier 316 at the selected depth 318. Then the GC 214 scans 302 the execution stack 204 below the barrier 316 while the mutator 212 runs 832, thus increasing 802 concurrency 322 and improving 802 mutator 212 responsiveness. Selected 706 barrier locations 318 vary 816, 818 according to actual stack 204 activity, in order to provide optimized 802 concurrency instead of using an inflexible approach to barrier placement such as a fixed depth or fixed set of evenly spaced depths. Existing profiler 404 samples 326 or virtual machine interfaces 408 can be reused by BDSSO. Skinny samples 326 that lack profiler performance data such as execution time 502, cycle count 504, or memory used 506 may also be used for BDSSO, which allows sampling to be less costly in terms of processor 110 usage and memory 112 consumed by samples 326. The teachings provided herein may be applied to computing systems 102 in a cloud, on servers, workstations, or elsewhere, and thereby provide specific concurrency enhancements that improve application software responsiveness and support automatic memory reclamation.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into garbage collection software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 7 and 8 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, sample fields, specific kinds of runtimes or programming languages or architectures, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/ or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A concurrency-enhanced system, comprising:
an execution stack of a program, the execution stack including execution frames over a time period of interest;
a memory, the memory configured by the execution stack, the memory also configured by behavior-driven stack scan optimization (BDSSO) software;
a processor in operable communication with the memory, the processor configured to execute the BDSSO software to perform BDSSO steps which include (a) obtaining execution stack frame occurrence data, (b) determining from the execution stack frame occurrence data, for each of a plurality of execution frames, a respective frame execution likelihood indicating a computed likelihood that a respective execution frame will be accessed while a tracing garbage collector scans the execution stack, (c) selecting a stack scan depth based at least in part on the frame execution likelihoods, the selected stack scan depth being less than a full depth of the entire execution stack, (d) installing a garbage collection scan return barrier at the selected stack scan depth, and then (e) allowing the tracing garbage collector to scan the execution stack below the scan return barrier while the program is running.

2. The system of claim 1, further comprising execution samples created by a profiler tool during an execution of the program, and wherein the BDSSO software obtains the execution stack frame occurrence data at least in part by analyzing the execution samples.

3. The system of claim 1, further comprising a managed runtime, and wherein the BDSSO software obtains the execution stack frame occurrence data at least in part by gathering stack data at garbage collection safepoints utilizing the managed runtime.

4. The system of claim 1, wherein the system is further characterized by differing from a fixed depth stack scanning system in at least one of the following ways:
   the garbage collection scan return barrier is installed below at least two frames of the execution stack;
   the system has a plurality of programs, and the selected stack scan depth varies between programs; or
   the selected stack scan depth varies for different time periods of interest for a given program during an execution of the given program.

5. The system of claim 1, wherein the processor comprises N cores with N being at least two, the program comprises M threads, wherein M is greater than or equal to 2 but less than or equal to N, each thread has a respective execution stack, and the BDSSO software performs the BDSSO steps on a per-thread basis for each of the M threads.

6. The system of claim 1, wherein the execution stack frame occurrence data includes return addresses and is free of each of the following: data stating an elapsed execution time, and data stating a processor cycles count.

7. A concurrency enhancement method for optimizing execution stack tracing for garbage collection, the method comprising:
   obtaining execution stack frame occurrence data for an execution stack;
   automatically determining from the execution stack frame occurrence data, for each of a plurality of execution frames, a respective frame execution likelihood indicating a computed likelihood that a respective execution frame will be accessed while a tracing garbage collector scans the execution stack;
   automatically selecting a stack scan depth based at least in part on the frame execution likelihoods, the selected stack scan depth being less than a full depth of the entire execution stack;
   automatically installing a garbage collection scan return barrier at the selected stack scan depth; and
   allowing the tracing garbage collector to scan the execution stack only to the selected stack scan depth.

8. The method of claim 7, wherein the execution stack frame occurrence data includes stack frame snapshots for different points during execution of a program, and determining a frame execution likelihood includes tallying how many times a particular set of execution frames occurs in a set of stack frame snapshots.

9. The method of claim 7, wherein determining a frame execution likelihood includes at least one of the following: comparing an elapsed execution time for a partial execution of a routine to an estimated execution time for a complete execution of the routine, or determining an estimated completion time for completing execution of the routine.

10. The method of claim 7, wherein obtaining execution stack frame occurrence data comprises periodically sampling the execution stack during execution of a program.

11. The method of claim 7, wherein the execution stack frame occurrence data includes stack frame snapshots for different points during execution of a program, a majority of the snapshots each show a stack depth of at least one hundred frames, and the selected stack scan depth is less than ten and more than one.

12. The method of claim 7, wherein determining the frame execution likelihood and selecting the stack scan depth is performed without reading or otherwise relying on any of the following: data stating an elapsed execution time for any stack frame, data stating a processor cycles count for any stack frame, or data stating a memory consumption amount for any stack frame.

13. The method of claim 7, wherein obtaining execution stack frame occurrence data comprises obtaining execution samples created by a profiler tool.

14. The method of claim 7, wherein obtaining execution stack frame occurrence data comprises utilizing a managed runtime for profiling at garbage collection safepoints.

15. The method of claim 7, wherein the method comprises performing at least the obtaining, determining, selecting, and installing with each of a plurality of execution stacks of respective threads on a per-thread basis for at least two threads of an application program.

16. A computer-readable storage medium configured with data and instructions which upon execution by a processor cause a computing system to perform a concurrency enhancement method of optimizing execution stack tracing for garbage collection, the method comprising:
   obtaining execution stack frame occurrence data for an execution stack of a program;
   automatically determining from the execution stack frame occurrence data, for each of a plurality of execution frames, a respective frame execution likelihood indicating a computed likelihood that a respective execution frame will be accessed while a tracing garbage collector scans the execution stack;
   automatically selecting a stack scan depth based at least in part on the frame execution likelihoods, the selected stack scan depth being less than a full depth of the entire execution stack;
   automatically installing a garbage collection scan return barrier at the selected stack scan depth; and
   allowing the tracing garbage collector to scan the execution stack only to the selected stack scan depth.

17. The computer-readable storage medium of claim 16, wherein the program hits the scan return barrier, and the method further comprises: removing the scan return barrier, automatically selecting a different stack scan depth, and automatically installing the scan return barrier at the different stack scan depth.

18. The computer-readable storage medium of claim 16, wherein the execution stack corresponds to a thread of the program, the method repeats the selecting and installing with different stack scan depths at different times during execution of the thread, and each time the garbage collection scan return barrier is installed below at least two frames of the execution stack.

19. The computer-readable storage medium of claim 18, wherein the execution stack frame occurrence data includes stack frame snapshots for different points during execution of the program, at least 80% of the snapshots each show a stack depth of at least eighty frames, and the selected stack scan depth is less than nine.

20. The computer-readable storage medium of claim 16, wherein determining a frame execution likelihood includes comparing a frame execution probability to a frame execution probability threshold.

* * * * *